United States Patent
Braun et al.

[11] Patent Number: 5,975,389
[45] Date of Patent: Nov. 2, 1999

[54] BACKPACK WITH EXTENDABLE SUB-FRAME

[76] Inventors: Joel L. Braun; Kimberly F. Braun, both of N7093 Center St., Horicon, Wis. 53032

[21] Appl. No.: 08/949,522

[22] Filed: Oct. 14, 1997

[51] Int. Cl.⁶ .............. A45F 4/02; A47C 13/00; A01M 31/02
[52] U.S. Cl. ............ 224/155; 224/153; 224/633; 224/634; 224/913; 224/916; 297/129; 182/187
[58] Field of Search ............... 224/155, 153, 224/913, 916, 633, 634; 297/129; 182/187

[56] References Cited

U.S. PATENT DOCUMENTS

| | | | |
|---|---|---|---|
| 3,266,686 | 8/1966 | Griffith | 224/9 |
| 4,321,983 | 3/1982 | Nelson | 182/187 |
| 4,582,165 | 4/1986 | Latini | 224/155 |
| 4,883,206 | 11/1989 | Miller | 224/153 |
| 5,381,941 | 1/1995 | Brune | 224/155 |
| 5,445,301 | 8/1995 | Biedenharn | 224/155 |
| 5,588,570 | 12/1996 | Zirbel | 224/155 |

FOREIGN PATENT DOCUMENTS 109653  2/1944  Sweden .................. 224/913

*Primary Examiner*—Linda J. Sholl
*Attorney, Agent, or Firm*—Donald Cayen

[57] ABSTRACT

A backpack has a pair of vertical posts, a base connected to the posts, and an extension that is slidable within the base. Various accessories such as tree claws and clamps for holding guns and bows are attachable to the base and extension. By sliding the extension within the base, the distance between the tree claws or clamps can be adjusted. A seat having a concave undersurface is pivotally connected to the post. When in a folded mode, the seat nests between the posts, and the seat undersurface bears against the back of the person to thereby make the backpack comfortable to carry.

15 Claims, 6 Drawing Sheets

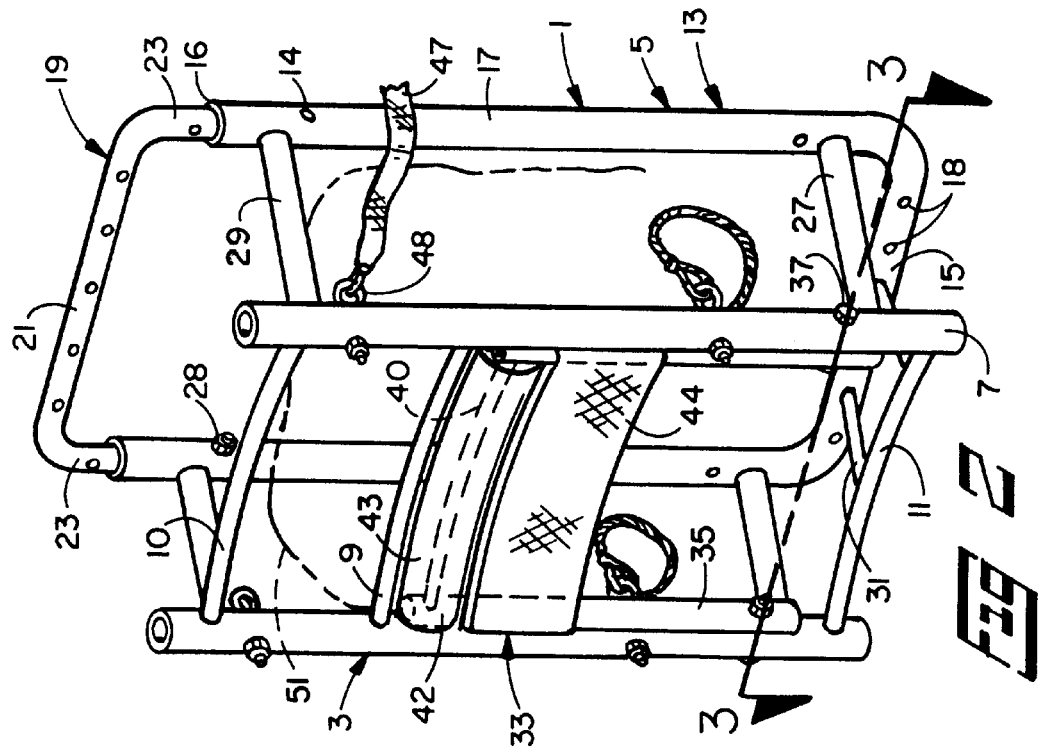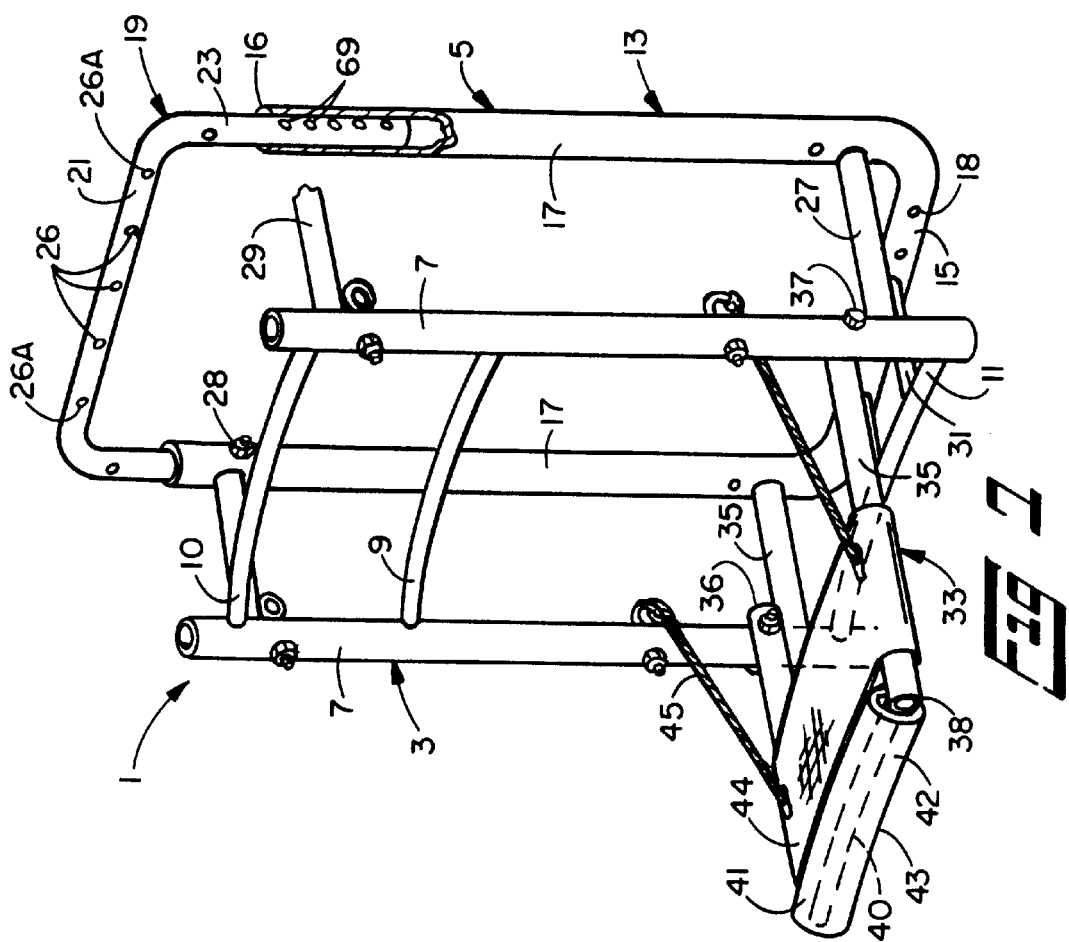

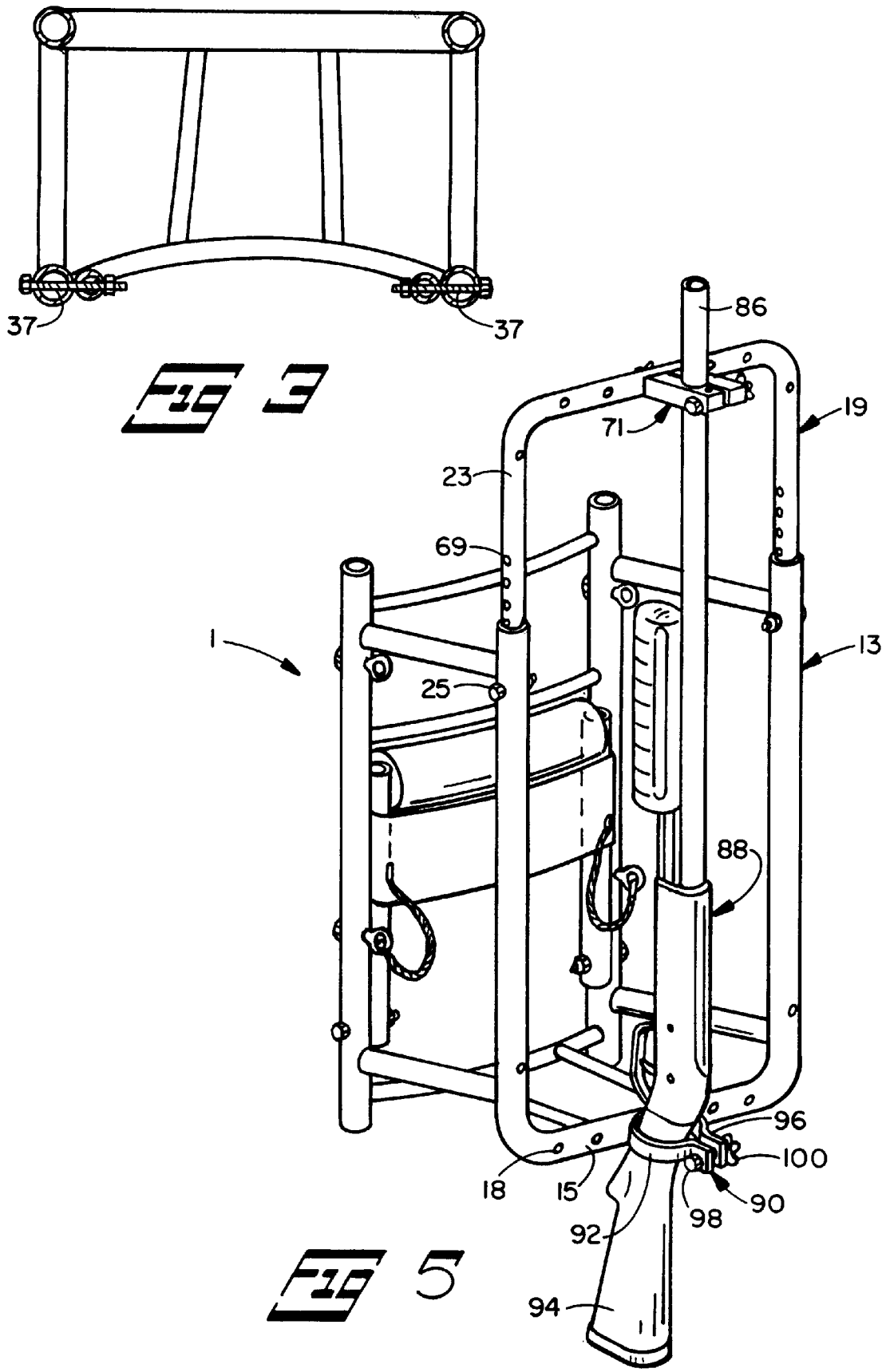

BACKPACK WITH EXTENDABLE SUB-FRAME

BACKGROUND OF THE INVENTION

This invention pertains to backpacks, and more particularly to apparatus that is capable of simultaneously carrying a seat, selected hunting equipment, and a knapsack.

DESCRIPTION OF THE PRIOR ART

Various types of backpacks have been developed over the years. A number of them include built-in seats. Examples may be seen in U.S. Pat. Nos. 3,266,686; 4,022,292; 4,582,165; 5,381,941; and 5,588,570. In none of the backpacks of the foregoing patents is the seat nested inside the backpack frame when the backpack is carried by a person. U.S. Pat. No. 5,445,301 discloses a combination backpack and stool having two rigid rectangular sections joined by cross supports.

It is also known to construct backpacks with rather complicated frames. For example, U.S. Pat. No. 4,883,206 shows a frame that is extendable to make a cot.

It is often desirable to carry bows, guns, and other hunting equipment on a backpack. U.S. Pat. No. 5,465,887 shows an archery bow backpack carrier. U.S. Pat. No. 4,582,165 mentioned above is capable of carrying a bow and arrows.

Despite the large number of different backpacks currently available, there nevertheless is room for improvement to them.

SUMMARY OF THE INVENTION

In accordance with the present invention, a backpack with an extendable sub-frame is provided that is more versatile then prior backpacks. This is accomplished by apparatus that includes clamps and other accessories that are removably attachable to the sub-frame.

A primary frame of the backpack of the invention has two parallel vertical posts. The posts are spaced apart and joined by a lower cross tube and at least one upper cross tube. The two posts of the main frame define a generally flat plane. The sub-frame is constructed with a base having two upstanding side legs and a horizontal middle leg. A generally U-shaped extension has a center leg and two side legs. The extension side legs have respective free ends that are slidable within the upstanding legs of the sub-frame base. Accordingly, the sub-frame is extendable. Bolts and nuts retain the extension at the desired position relative to the base. The main and sub-frames are connected by side support tubes and at least one seat support tube between the lower cross tube of the main frame and the middle leg of the sub-frame base. A conventional flexible knapsack can be placed between the two frames and supported there by the seat support tube. The backpack is furnished with a long strap that is fastened to the main frame. The strap is used to secure the backpack to a tree or similar support.

It is a feature of the invention that multiple accessories can be removably attached to the sub-frame base and extension. The accessories include claws for bearing against trees, clamps for carrying gun and bows, and hangers for carrying tree stands and the like. By adjusting the sub-frame extension, the distance between the accessories can be varied to suit the length of different guns and bows. Each of the various accessories is attached to the backpack by removable fasteners.

Further in accordance with the present invention, a seat is pivotally connected to the posts of the main frame. The seat is pivotable to an unfolded mode whereat it is generally perpendicular to the plane of the main frame posts. Flexible cables from the posts hold the seat in the unfolded mode. At least a portion of the seat upper surface is convex, thereby rendering the seat comfortable to sit on, which is done when the backpack is secured to a tree or the like. The seat is also pivotable to a folded mode whereat it nests generally between the main frame posts. The undersurface of a pad on the seat is concave. The pad undersurface serves as a comfortable surface that bears against the back of the person carrying the backpack.

The method and apparatus of the invention, using an adjustable sub-frame and multiple accessories, thus enables several types of hunting equipment and the like to be carried with ease and convenience. The pivotable seat doubles as a load bearing surface for the backpack when it is carried by a person, even though the seat is pivotable to an unfolded mode for comfortable sitting.

Other advantages, benefits, and features of the present invention will become apparent to those skilled in the art upon reading the detailed description of the invention.

BRIEF DESCRIPTION OF THE DRAWINGS

FIG. 1 is a partially broken front perspective view of the invention showing the seat thereof in an unfolded mode.

FIG. 2 is a view generally similar to FIG. 1, but showing the seat in a folded mode.

FIG. 3 is a cross sectional view taken along line 3—3 of FIG. 2.

FIG. 5 is a back perspective view of the invention showing the seat in a folded mode and a gun carried by clamps that are attached to the sub-frame.

DETAILED DESCRIPTION OF THE PREFERRED EMBODIMENT

Figure 6:
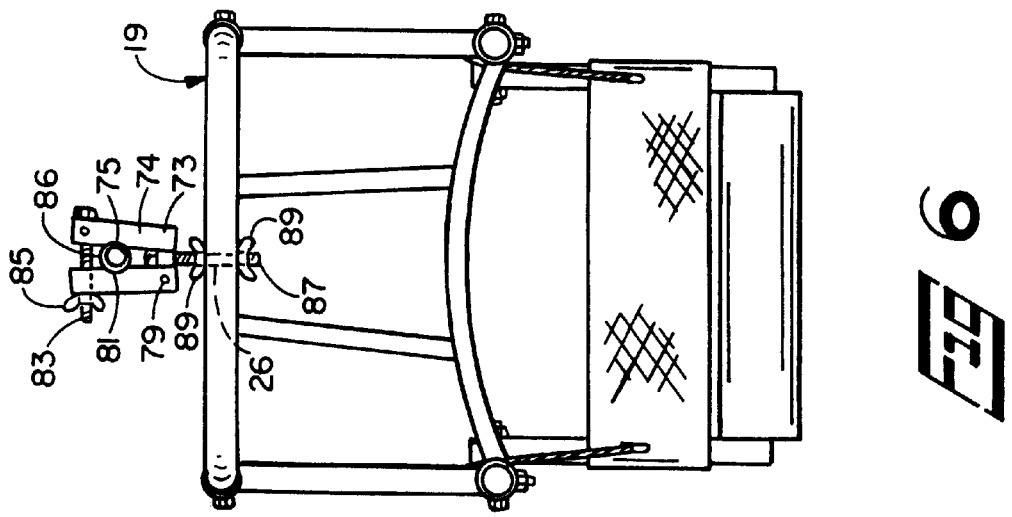
FIG. 6 is a top view of FIG. 5.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1–4, a backpack 1 is illustrated that includes the present invention. The backpack 1 is particularly useful for carrying hunting equipment in the field, but it will be understood that the invention is not limited to hunting related applications.

The backpack 1 is comprised of a main frame 3 and a sub-frame 5, both of which are preferably made from aluminum tubing. The main frame 3 has two vertical posts 7 joined by one or more horizontal upper cross tubes 9, 10 and a lower cross tube 11. The posts 7 define a front plane. The cross tubes 9, 10, and 11 are concave inwardly toward the sub-frame 5.

In the preferred embodiment, the sub-frame 5 is constructed as a U-shaped base 13 having a middle leg 15 and two upstanding side legs 17. There is a cross hole 14 near the free end 16 of each side leg 17. There are several holes 18 in the middle leg 15. A U-shaped extension 19 has a center leg 21 and two side legs 23. The side legs 23 of the extension 19 slide inside the legs 17 of the base 13. There are several cross holes 69 in the extension legs 23 that are alignable with the holes 14 in the base legs 17. Bolts 25 passing through the holes 14 in the legs 17 and through selected holes 69 in the extension side legs 23 retain the extension at the desired position relative to the base 13. The bolts 25 are secured with wing nuts 28. There is at least one and preferably several holes 26 through the extension center leg 21. Pairs of side support tubes 27 and 29 connect the sub-frame base 13 to the main frame 3. At least one and preferably two seat support tubes 31 connect the main frame lower cross tube 11 to the sub-frame base middle leg 15.

The backpack 1 further comprises a seat 33 that is pivotally connected to the main frame 3. The seat 33 includes a pair of tubes 35 each having a first end 36 pivotally connected by a respective pin 37 to a post 7 of the main frame. The pins 37 are located above the lower cross tube 11. The second ends 38 of the seat tubes 35 are joined by an upwardly convex end tube 40. A comfortable pad 42 covers the end tube 40. Consequently, the pad 42 has a convex upper surface 41 and a concave undersurface 43. Adjacent the pad 42 is a webbing 44 that is stretched between the seat tubes 35. The seat is pivotable to an unfolded mode as shown in FIG. 1, whereat the seat lies in a plane generally perpendicular to the plane of the main frame posts. Flexible cables 45 hold the seat in the unfolded mode. The seat is also pivotable to a folded mode, FIG. 2. When in the folded mode, the seat nests between the posts. The seat end tube 40 is curved the same amount as the main frame cross tubes 9, 10, and 11. Accordingly, the seat end tube and the pad 42 lie generally in the same curved plane as the cross tubes 9, 10, and 11.

A tree strap 47 is fastened, as by eyebolts 48, to the two posts 7 of the main frame 3 between the upper cross tubes 9 and 10. A pair of shoulder straps, not shown, are each fastened at one end thereof to the cross tube 10 and at the other end to the lower end of an associated post. If desired, the pins 37 can be used to fasten the shoulder straps to the posts as well as to provide the pivot points for the seat 33. A loose knapsack 51 is supported by the seat support tubes 31. The side support tubes 27 and 29 also hold the knapsack 51 in place. The knapsack can be of any suitable design. The open spaces of the backpack frames allow easy access to various pockets in the knapsack.

Figure 4:
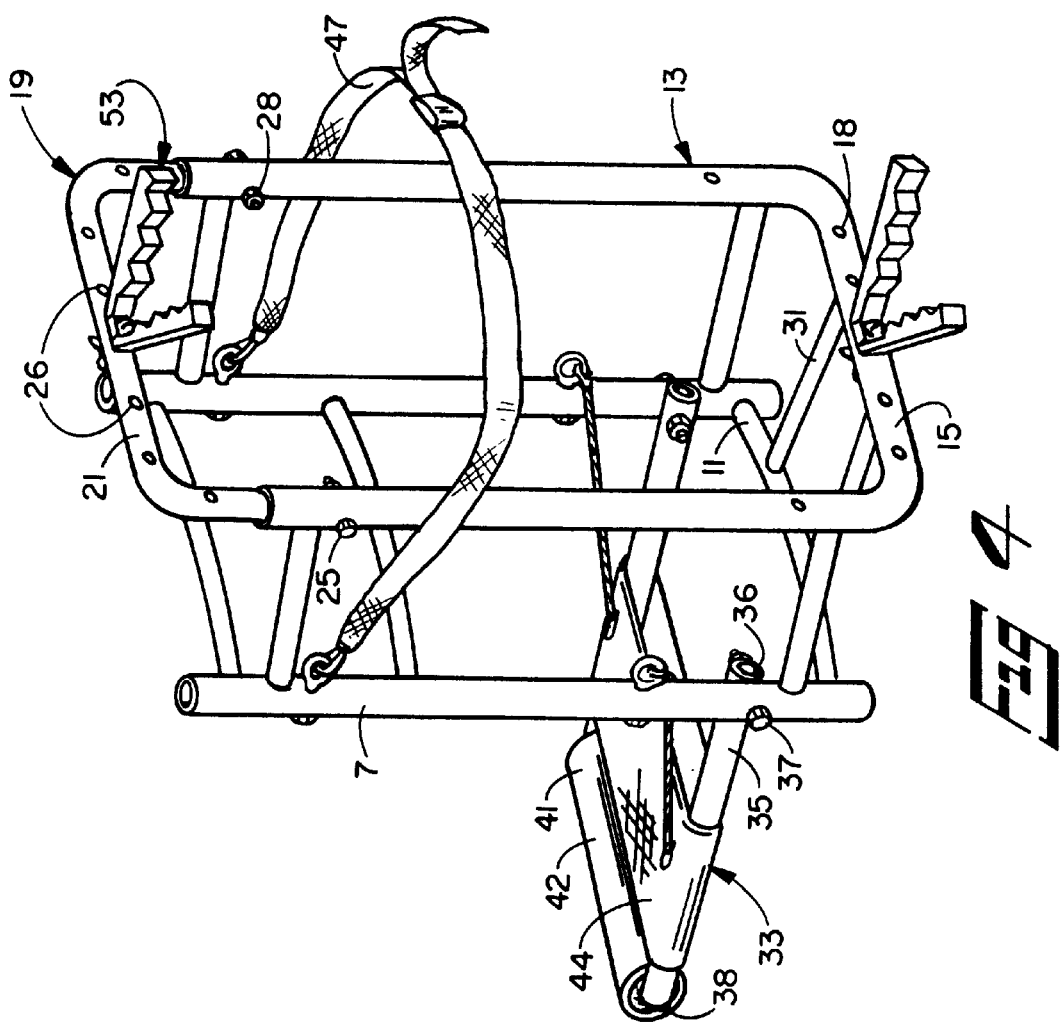
FIG. 4 is a back perspective view of the invention showing the seat in an unfolded mode and with tree claws attached to the sub-frame.
Figure 8:
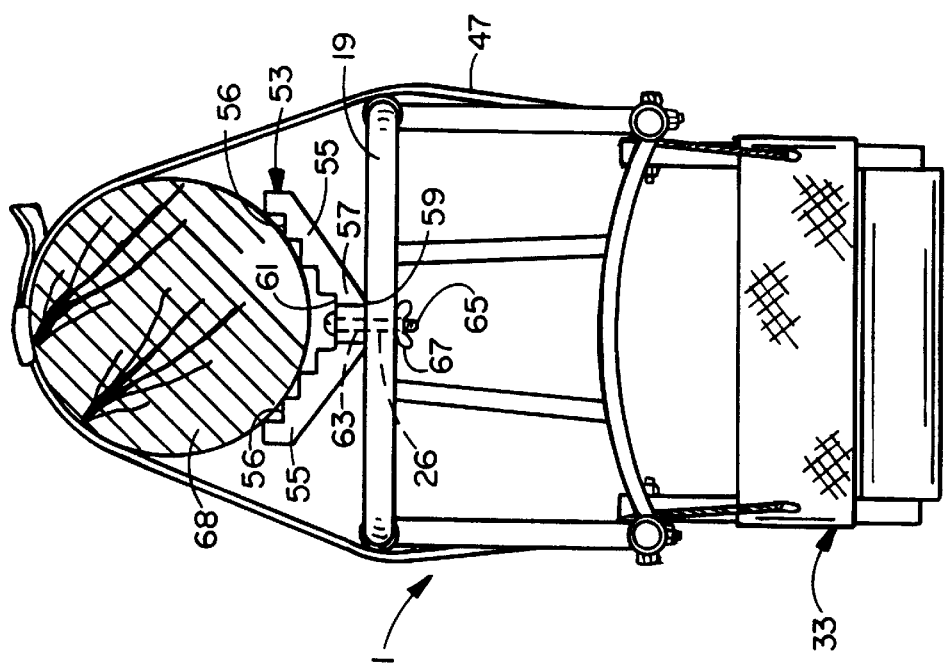
FIG. 8 is a view taken along line 8—8 of FIG. 4 showing the backpack secured against a tree.

Further in accordance with the present invention, the backpack 1 can be provided with several accessories that are removably attachable to the sub-frame 5. Looking at FIG. 4, a pair of tree claws 53 are shown, one attached to the middle leg 15 of the base 13 and the other attached to the center leg 21 of the extension 19. As best shown in FIG. 8, each claw 53 is manufactured in a generally V-shape with two arms 55. Inside surfaces of the arms 55 have coarse teeth 56. The arms join at a center section 57 that has a flat outside surface 59 and a flat inside surface 61. A hole 63 extends through the center section 57 between the surfaces 59 and 61. Attachment of one claw may be by a wing nut 67 and a bolt 65 that passes through the hole 63 in the claw and through a hole 26 in the extension center leg 19. The other claw is attached to the middle leg 15 of the base 13 using a hole 18. In FIG. 4, the extension 19 is shown retracted into the base. However, it will be appreciated that the extension can be extended out of the base so as to increase the distance between the extension center leg and the base middle leg. The extension is retained at a desired position relative to the base by the bolts 25. In that manner, the distance between the tree claws can be adjusted to suit different situations in the field.

In FIG. 8, a tree claw 53 is shown in use against a tree 68. The backpack 1 is secured in place against the tree 68 by the strap 47. When the backpack is secured to the tree, the seat 33 can be pivoted to the unfolded mode of FIG. 4. The combination convex upper surface 41 of the seat pad 42 and the webbing 44 is very comfortable for a person to sit on saddle-like, with his legs on the sides of the seat tubes 35.

The versatility of the invention is further demonstrated in FIGS. 5 and 6. The backpack 1 is shown with the extension 19 extended out of the base 13. The bolts 25 pass through the desired holes 69 in the extension side legs 23. A gun barrel clamp 71 is attached to the extension. The gun barrel clamp 71 is comprised of an L-shaped beam 73. The inside surface of a long leg 74 of the beam 73 has an arcuate recess 75. A finger 77 is pivotable about a pin 79 in the beam and has an arcuate recess 81 opposite the recess 75 in the beam. A threaded stud 83 is pivotally connected to the beam leg 74 and passes through a slot in the finger 77. A wing nut 85 on the stud 83 adjustably positions the finger relative to the beam long leg so as to clamp the barrel 86 of a gun 88 in the recesses 75 and 81. A bolt 87 passing through the hole 26 in the extension 19 and locked in place by wing nuts 89 attaches the gun barrel clamp to the extension.

A gun stock clamp 90 is similarly attached to the base middle leg 15 by means of a hole 18 therein. The gun stock clamp 90 has two legs 92, 96 that are curved to fit around the stock 94 of the gun 88. The legs 92, 96 are pivotable relative to each other, and they are clampable together by a hinged stud 98 and wing nut 100. The variable distance between the clamps 71 and 90 enable the backpack 1 to suit different gun models.

Figure 9:
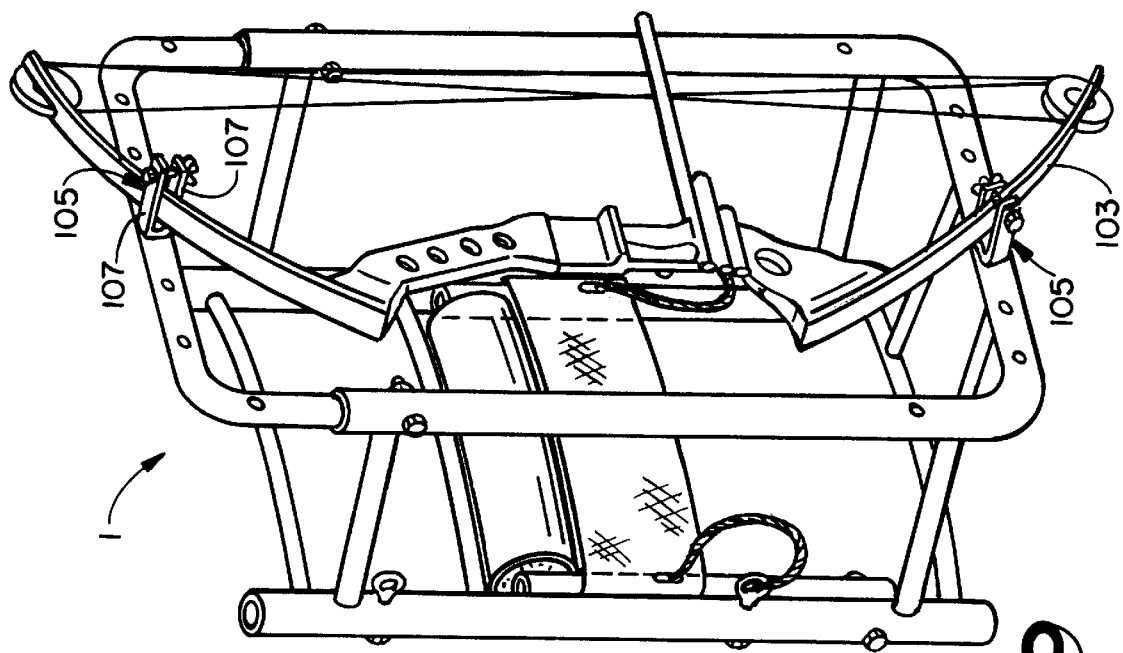
FIG. 9 is a view similar to FIG. 5, but showing a bow carried by the backpack and clamps of the invention.

FIG. 9 shows the backpack 1 carrying a bow 103. For that purpose, a pair of clamps 105 are used. The clamps 105 are generally similar to the clamps 71 described previously with respect to FIGS. 5 and 6. However, the legs 107 of the clamps 105 do not need any recesses.

Figure 10:
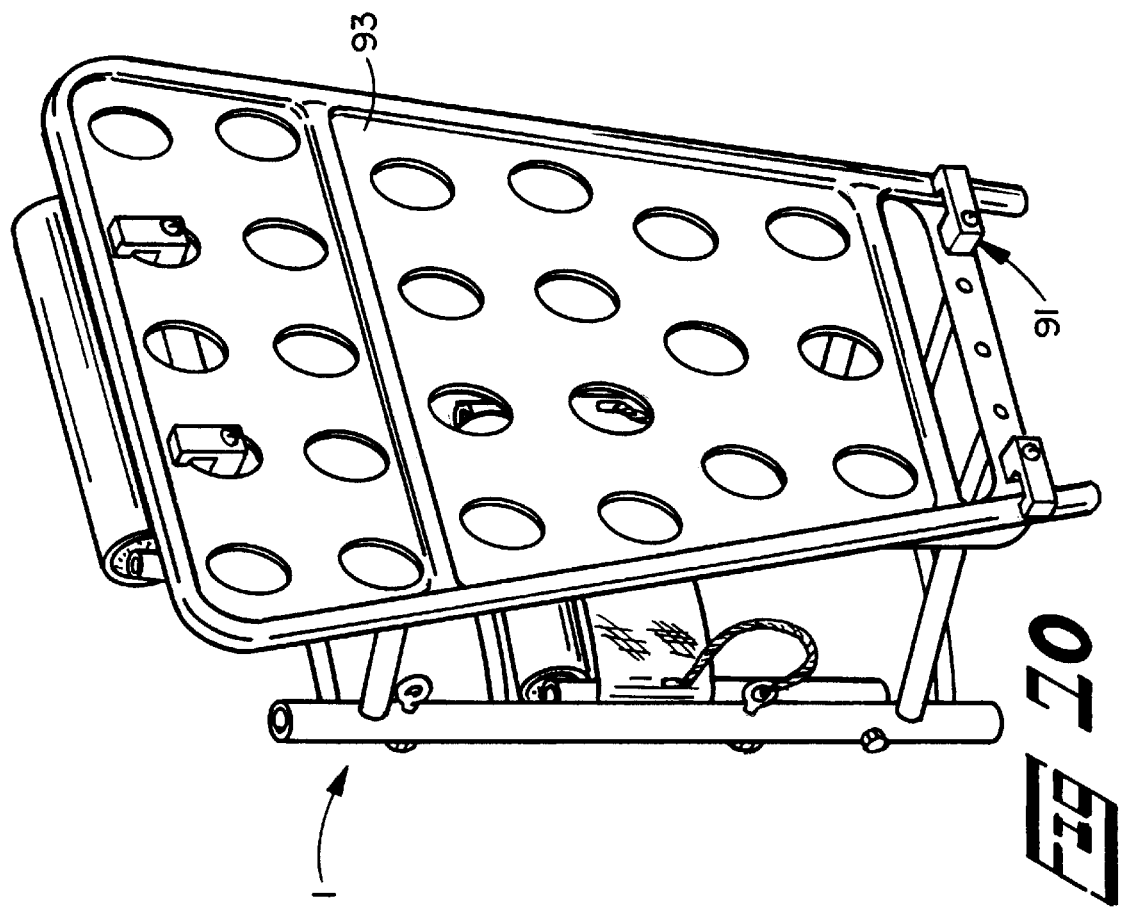
FIG. 10 is a view similar to FIG. 5, but showing the tree stand of FIG. 7 carried by the backpack.
Figure 7:
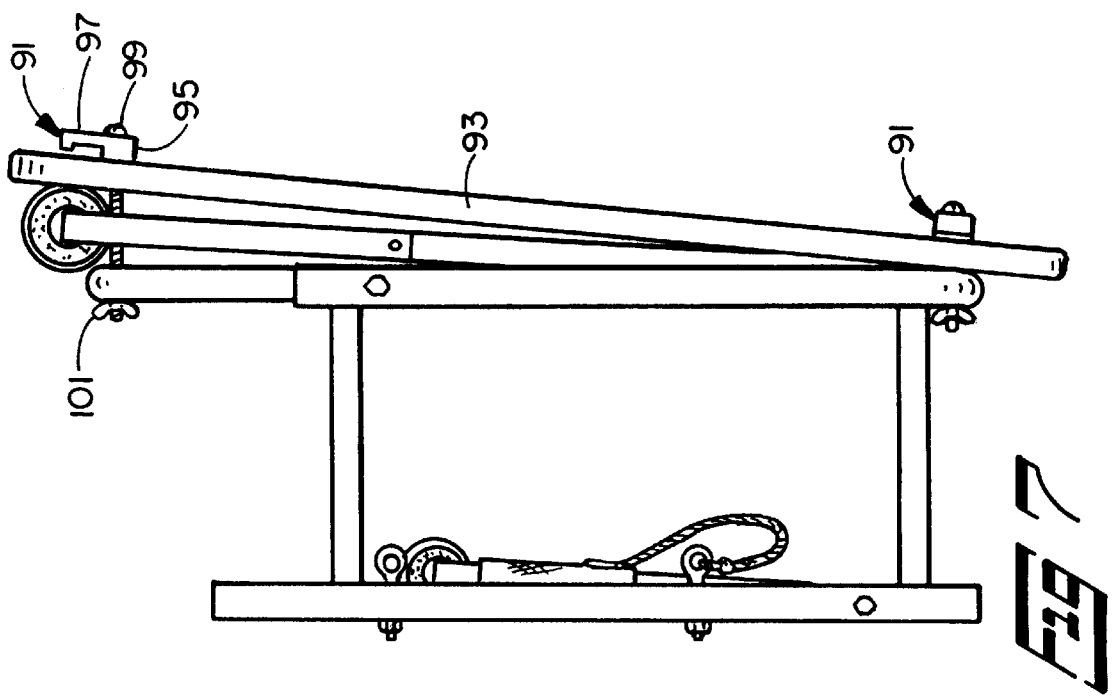
FIG. 7 is a partially broken side view of the invention showing a tree stand carried on hangers that are attached to the sub-frame.

FIGS. 7 and 10 show hangers 91 that are used to carry a tree stand 93 or similar piece of hunting equipment. The hanger 91 is generally L-shaped, having a body section 95 with a hole therethrough. A lip 97 upstands from the body section 95. A long bolt 99 passes through a hole in the body section and is locked to the backpack by a wing nut 101. By placing the hangers in side holes such as holes 26A, FIG. 1, the gun clamps 71 and 90, or the bow clamp 105, can be used with a center hole 26. In that manner, a gun or bow can be carried along with the tree stand 93.

Figure 11:
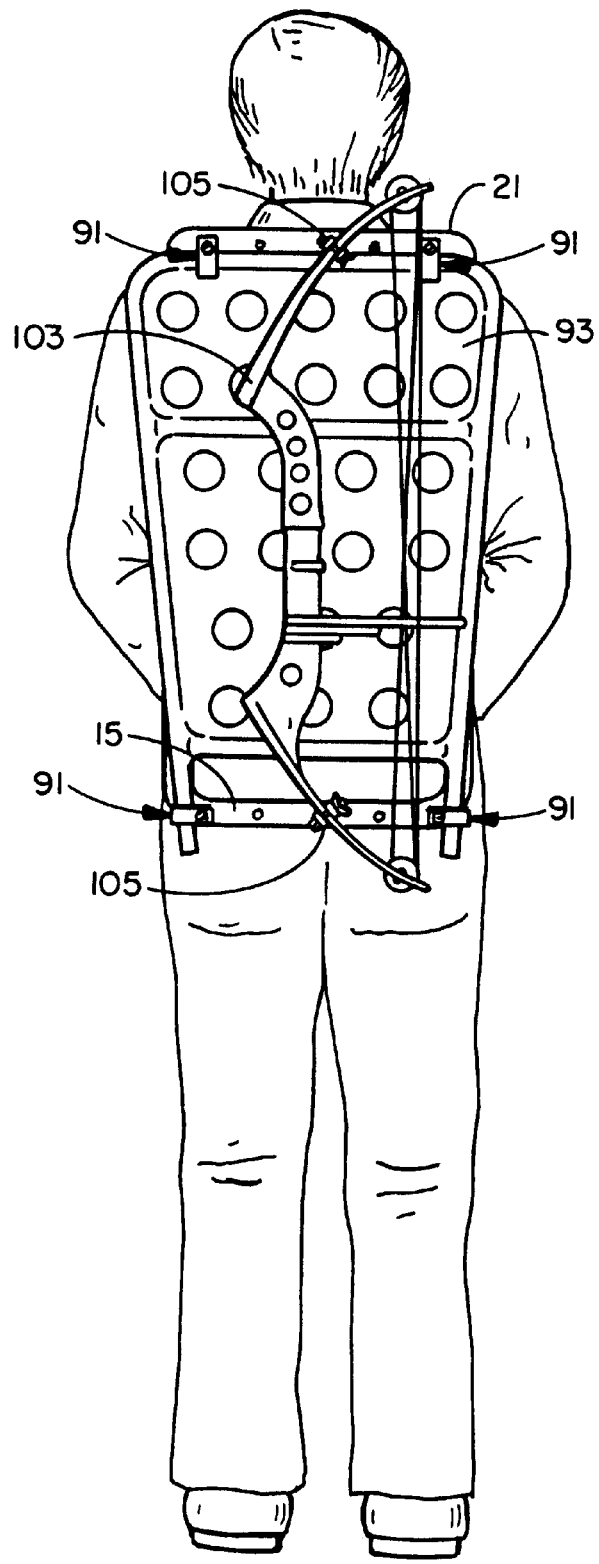
FIG. 11 is a back view of a person carrying the backpack along with selected items of hunting equipment.

To carry the backpack 1 together with a knapsack 51, the seat 33 is pivoted to the folded mode of FIG. 2. The person places the pad undersurface 43 and the webbing 44 against his back. The cross tubes 9, 10, and 11, as well as the pad undersurface, conform to his back and shoulders, thus making the backpack comfortable to carry. Any or none of the gun 88, bow 103, tree stand 93, or tree claws 53 can be carried along with the backpack. In FIG. 11, for example, a person is shown carrying the backpack along with a bow 103 and a tree stand 93. In that situation, two bow clamps 105 are used to hold the bow, and four hangers 91 are used to hold the tree stand. Further, the distance between the extension center leg 21 and the base middle leg 15 can be varied by means of the bolts 25 and holes 69 to suit the particular pieces of equipment being carried.

In summary, the results and advantages of various types of hunting equipment can now be more fully realized. The backpack 1 provides both comfort and convenience when carrying the hunting equipment in the field. This desirable result comes from using the combined functions of the sub-frame 5. The slidable extension 19 and the fixed base 13 are provided with holes that are used to attach different accessories to the backpack. The extension is adjustable relative to the base to accommodate different items of the hunting equipment such as guns and bows. The convex upper surface 41 of the pivotable seat 33 provides comfort for a person when he is sitting, and the seat pad undersurface 43 provides comfort when the person is carrying the backpack.

It will also be recognized that in addition to the superior performance of the backpack 1, its construction is such as to cost little if any more than traditional backpacks. Also, because the backpack is made of rugged components and is of a simple design, it will give many years of service with minimal maintenance.

Thus, it is apparent that there has been provided, in accordance with the invention, a backpack with an extendable sub-frame that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A backpack comprising:
   a. a main frame comprising:
      i. a pair of vertical posts; and
      ii. at least two horizontal cross tubes joined to the posts;
   b. a sub-frame comprising:
      i. a U-shaped base having two upstanding legs and a middle leg; and
      ii. an extension having a center leg and side legs that are slidable within the upstanding legs of the base;
   c. bolt means for retaining the extension at a selected position relative to the base;
   d. seat support means for joining the main frame to the sub-frame base; and
   e. a seat pivotally connected to the main frame posts.

2. The backpack of claim 1 wherein:
   a. the seat is selectively pivotable between an unfolded mode whereat a person can sit on the seat and a folded mode whereat the seat nests generally between the posts of the main frame; and
   b. the seat has a convex upper surface upon which the person sits and a concave undersurface that bears against the back of the person when the person carries the backpack.

3. The backpack of claim 1 further comprising a first tree claw attached to the sub-frame extension and a second tree claw attached to the sub-frame base, each tree claw comprising:
   a. a pair of arms having coarse teeth on respective inside surfaces and joined to a center section; and
   b. fastener means passing through the center section and through a hole in the associated sub-frame base and extension,
      so that the distance between the tree claws can be adjusted by extending or retracting the sub-frame extension out of or into the base.

4. The backpack of claim 1 further comprising:
   a. a first clamp attached to the sub-frame base and a second clamp attached to the sub-frame extension, each clamp comprising an L-shaped beam, a finger pivotally connected to the beam, and stud means for adjustably locating the finger relative to the beam to enable the beam and the finger of each clamp to hold a gun or bow between them; and
   b. fastener means for attaching the clamps to the base and extension,
      so that the distance between the first and second clamps can be adjusted by extending or retracting the extension out of and into the base.

5. The backpack of claim 1 further comprising:
   a. a hanger having a body section and a lip upstanding from the body section; and
   b. fastener means for attaching the hanger to the extension,
      so that a tree stand or the like can be carried on the backpack by the hanger.

6. Apparatus for carrying selected items of hunting equipment comprising:
   a. a base having two upstanding legs, wherein the base has a middle leg between the two upstanding legs;
   b. a pair of vertical posts connected to the base;
   c. an extension that is received within the base upstanding legs and is slideable therein between extended and retracted positions, wherein the extension has two side legs that are slideably received in the base upstanding legs and a center leg;
   d. bolt means for retaining the extension at a selected position relative to the base; and
   e. a pair of tree claws one attached to the base middle leg and the other attached to the extension center leg,
      so that the distance between the base middle leg and the extension center leg is adjustable by sliding the extension side legs within the base upstanding legs, and so that the distance between the two claws can be adjusted by sliding the extension side legs within the base upstanding legs.

7. The apparatus of claim 6 wherein:
   a. the base middle leg and the extension center leg each define at least one hole therethrough;
   b. each tree claw comprises:
      i. a pair of arms each having an inside surface that defines a plurality of coarse teeth and a center section between the arms; and
      ii. a fastener passing through a hole in the tree claw center section, the fastener of one of the tree claws passing through the hole in the extension center leg and the fastener of the other tree claw passing through the hole in the base middle leg; and
   c. nut means for cooperating with the fastener to attach the tree claw to the extension and the base.

8. The apparatus of claim 6 further comprising a pair of clamps each having an L-shaped beam and finger means for cooperating with the beam to removably hold a gun or a bow, the beam of one clamp being attached to the extension center leg and the beam of the other clamp being attached to the base middle leg, the distance between the clamps being adjustable to suit different guns and bows by sliding the extension side legs within the base upstanding legs.

9. The apparatus of claim 6 further comprising a hanger having a body section attached to the extension and a lip upstanding from the body section, the body section and lip cooperating to hold a tree stand or the like to the extension.

10. Apparatus for carrying selected items of hunting equipment comprising:
   a. a base having two upstanding legs;
   b. a pair of vertical posts connected to the base;
   c. an extension that is received within the base upstanding legs and is slidable therein between extended and retracted positions;
   d. bolt means for retaining the extension at a selected position relative to the base; and
   e. a seat connected to the vertical posts, the seat having a convex upper surface and a concave undersurface, the seat being pivotable to an unfolded mode to enable a person to sit on the convex upper surface and to a folded mode whereat the seat nests between the posts and the seat undersurface is placable against the back of a person.

11. Apparatus for carrying selected items of hunting equipment comprising:
   a. a base having two upstanding legs;
   b. a pair of vertical posts connected to the base;
   c. an extension that is received within the base upstanding legs and is slidable therein between extended and retracted positions;
   d. bolt means for retaining the extension at a selected position relative to the base; and
   e. a seat comprising:
      i. a pair of seat tubes connected to the posts and an end tube joined to the seat tubes, the end tube being convex upwardly;
      ii. a pad covering the end tube, the pad having a convex upper surface and a concave undersurface; and
      iii. a webbing between the seat tubes and adjacent the pad, the seat being pivotable to an unfolded mode to enable a person to sit on the pad upper surface and the webbing, and to a folded mode whereat the seat nests between the posts and the pad undersurface and the webbing are placeable against the back of the person for carrying the apparatus.

12. A method of carrying selected hunting items comprising the steps of:
   a. providing a backpack having a pair of vertical posts, a base, tube means for connecting the base to the posts, and an extension slidably received in the base;
   b. slidably adjusting the extension to a selected position relative to the base;
   c. supporting a knapsack on the tube means;
   d. attaching a first tree claw to the base and a second tree claw to the extension; and
   e. sliding the extension within the base and thereby adjusting the distance between the first and second tree claws.

13. The method of claim 12 comprising the further steps of:
   a. attaching a first clamp to the base and a second clamp to the extension;
   b. sliding the extension within the base to adjust the distance between the clamps; and
   c. holding a gun or a bow in the first and second clamps, so that the distance between the clamps can be adjusted to suit the gun or bow.

14. The method of claim 12 comprising the further steps of:
   a. pivotally connecting a seat having a convex upper surface and a concave undersurface to the posts;
   b. pivoting the seat to a folded mode whereat it nests between the posts; and
   c. carrying the backpack by a person by placing the seat undersurface against the back of the person.

15. The method of claim 15 comprising the further steps of:
   a. attaching at least one first hanger to the base and at least one second hanger to the extension; and
   b. holding a tree stand to the first and second hangers and thereby enabling the tree stand to be carried along with the backpack.

* * * * *